(12) United States Patent
Kaneko et al.

(10) Patent No.: US 7,257,865 B2
(45) Date of Patent: Aug. 21, 2007

(54) HOLDER FOR CORD FASTENERS

(75) Inventors: Hitoshi Kaneko, Ooi-machi (JP); Shinichiro Kinebuchi, Taipei (TW)

(73) Assignee: YKK Corporation, Tokyo (JP)

( * ) Notice: Subject to any disclaimer, the term of this patent is extended or adjusted under 35 U.S.C. 154(b) by 15 days.

(21) Appl. No.: 11/199,296

(22) Filed: Aug. 8, 2005

(65) Prior Publication Data
US 2006/0085952 A1    Apr. 27, 2006

(30) Foreign Application Priority Data
Oct. 27, 2004   (JP) ............................. 2004-312825

(51) Int. Cl.
*A44B 21/00*  (2006.01)

(52) U.S. Cl. ................... 24/115 G; 24/712.5

(58) Field of Classification Search ............... 248/314; 24/115 G, 136 R, 115 H, 712.5; D8/383; 383/72–76; 2/160, 101, 69, 240, 244, 265, 2/266, 117, 137, 144, 145, 300, 336, 341, 2/271, 1, 123, 124, 16, 17, 139, 158, 159
See application file for complete search history.

(56) References Cited

U.S. PATENT DOCUMENTS

| | | |
|---|---|---|
| 5,192,144 A | 3/1993 | Doninger |
| 5,394,579 A * | 3/1995 | Walters ...................... 5/504.1 |
| 5,421,069 A | 6/1995 | Hamilton |
| 5,711,032 A * | 1/1998 | Carpenter ...................... 2/158 |
| 7,032,276 B1 * | 4/2006 | Olson ......................... 24/171 |

FOREIGN PATENT DOCUMENTS

| | | |
|---|---|---|
| EP | 1018609 A1 | 7/2000 |
| EP | 1326031 A2 | 7/2003 |
| FR | 2635652 | 3/1990 |
| JP | 7-39518 | 7/1995 |
| JP | 08080204 A * | 3/1996 |
| JP | 08089316 A * | 4/1996 |
| JP | 2005058583 A * | 3/2005 |

\* cited by examiner

*Primary Examiner*—James R. Brittain
(74) *Attorney, Agent, or Firm*—Everest Intellectual Property Law Group; Michael S. Leonard (57) ABSTRACT

A holder (4) holds a cord fastener (3) on an adhered object (1), the cord fastener (3) being equipped on a cord (2) of the adhered object (1). The holder (4) has a mounting part (40) attached to the adhered object (1), and a housing part (50) provided on the mounting part (40), and holding the cord fastener (3) so as to allow the cord fastener (3) to be housed therein. The housing part (50) holds the cord fastener (3) so as to allow the cord fastener (3) to be housed therein, with an operation part (31) of the cord fastener (3) being exposed. Also, the holder (4) has a third cord insertion hole (41, 57) which continuously communicates with a first cord insertion hole (12) of the cord fastener (3) when the cord fastener (3) is housed in the housing part (50).

3 Claims, 11 Drawing Sheets

HOLDER FOR CORD FASTENERS

BACKGROUND OF THE INVENTION

1. Field of the Invention

The present invention relates to a holder for holding a component, which is attached to a cord of an adhered object, on the adhered object. More particularly, the present invention relates to a holder for holding, for example, a cord fastener capable of being fixed to an arbitrary position of a cord, or a buckle capable of coupling/separating ends of two cords with/from each other, on an adhered object such as garments, bags, or the like provided with such a cord or cords.

2. Description of Related Art

Figure 11:
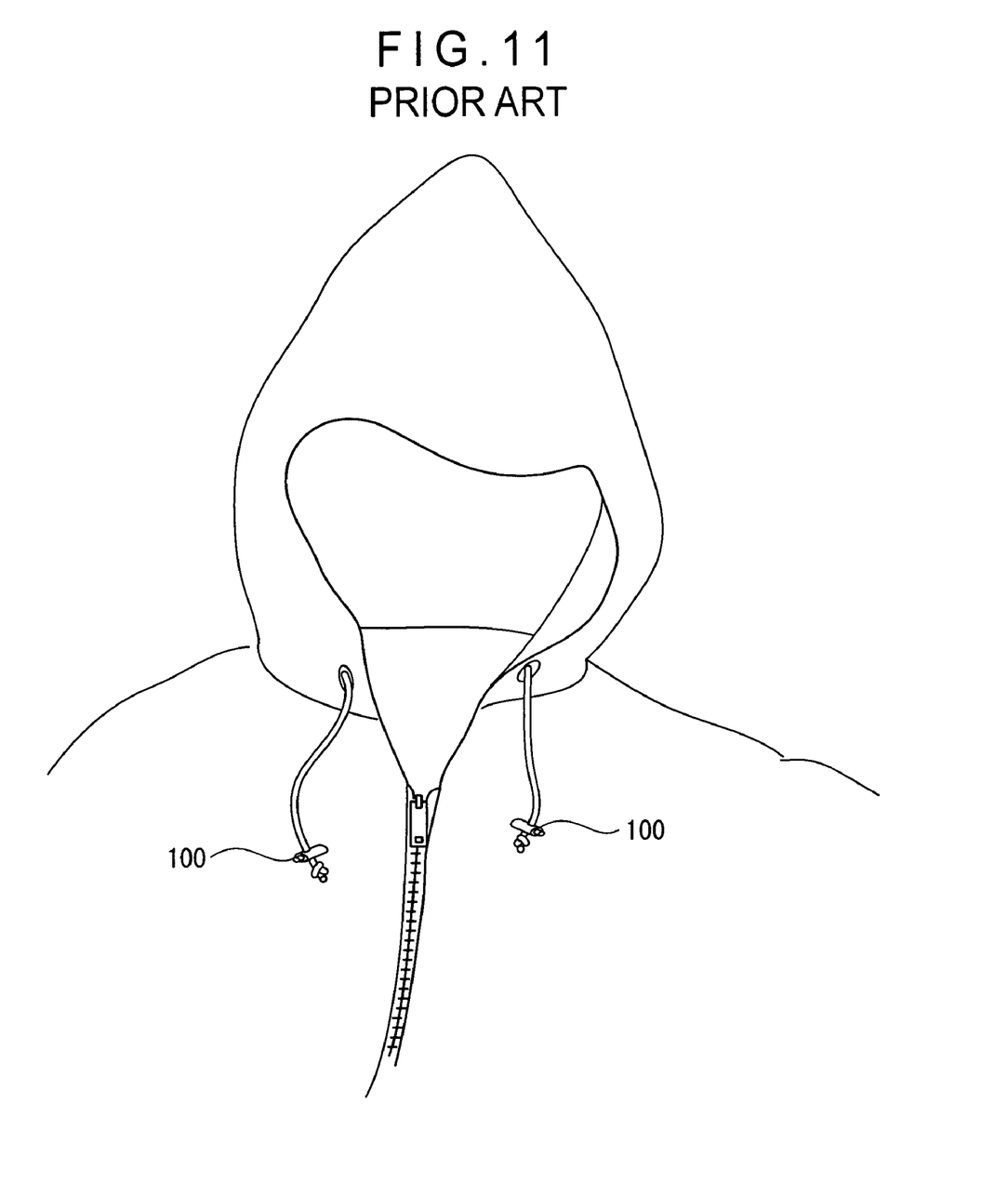
FIG. 11 is a view showing an example in which a conventional cord fastener is attached to a jacket.

Conventionally, a cord fastener has been used as a tool for tightening or loosening cuffs of garments, mouths of bags, and the like. For example, in the case of a jacket having a hood as shown in FIG. 11, a cord is inserted through the edge of the opening of the hood, and the hood is adjusted by adjusting the peripheral length of the cord around the opening with a cord fastener 100.

The cord fastener is constituted by a cylindrical socket, and a plug. The plug is contained in the socket, biased by a biasing unit such as a spring toward the direction in which the plug projects from the socket. Also, the plug can be pushed into the socket against the force of the biasing unit. The socket is formed with a first cord insertion hole penetrating through a plug insertion hole, into which the plug is inserted, the plug is formed with an operation part on an end thereof, and a second cord insertion hole which communicates with the first cord insertion hole when the plug is pushed into the socket by a predetermined amount.

In the state that the plug is pushed into the socket such that the second cord insertion hole is in alignment with the first cord insertion hole, a cord is inserted through these first and second cord insertion holes, and the cord fastener is moved to an arbitrary position along the cord. Thereafter, if the force pushing the plug is released, the plug will be moved toward the direction in which the plug projects from the socket due to the biasing force of the biasing unit. Accordingly, since the second cord insertion hole is shifted off of the first cord insertion hole, the cord is thereby sandwiched between these cord insertion holes, so that the cord fastener is fixed to an arbitrary position of the cord.

However, in the state that the opening of the hood is loosened, since such a cord fastener is positioned in the middle of the cord which is dangling from an adhered object such as a garment, the cord fastener dangle will dangle together with the cord dangle. Further, since the cord fastener contacts or collides into other things while dangling, the cord fastener may be damaged or lose its function as a cord fastener. Besides, since the cord fastener is made of hard material in view of its function, it will give sense of a foreign matter when the cord fastener contacts human skin directly or indirectly through the garment, in the case of a cord fastener that is attached to a garment or the like.

As a solution to the above problems, a proposal has been made for a cord fastener which can be held on an adhered object such as a garment (see, for example, Japanese Utility Model Laid-Open Publication No. Hei. 7-39518). The cord fastener disclosed in this publication is provided with an eyelet which holds the cord fastener on an adhered object. A male nail is formed on the cord fastener while a female nail is formed on the eyelet, and by engaging these nails with each other, the cord fastener is integrated with the eyelet. In other words, the cord fastener is held on the adhered object.

However, the cord fastener disclosed in the above publication has a complicated structure and is difficult to mold because male and female nails have to be formed respectively on the cord fastener and the eyelet. In addition, since the fastener is held by a male nail and a female nail, the engagement therebetween cannot be easily released. Besides, since the cord fastener is exposed from the surface of the adhered object, the cord fastener contacts and collides into external objects, and thereby the outer appearance or function of the cord fastener may be spoiled. If the cord fastener contacts the skin directly or indirectly through the garment, the user may have a sense of a foreign matter.

SUMMARY OF THE INVENTION

A major object of the present invention is to provide a holder which solves the problem of cord dangling, maintains the outer appearance and function of a cord fastener, is easy to use, and is also easy to mold.

The holder according to the present invention is a holder for holding a component, which is attached to a cord of an adhered object, on the adhered object, the holder including: a mounting part attached to the adhered object 1; and a housing part provided on the mounting part and holding the component so as to allow the component to be housed therein.

The component herein means a component that has some functionality for a cord or adhered object to which the component is attached. For example, the component may be a cord fastener which can be fixed to an arbitrary position of a cord, a buckle with which ends of two cords can be connected/disconnected with/from each other, or a cord-end attachment attached, as a cord stopper or ornament, to an end of a cord.

With this arrangement, the component is fixed to the adhered object by merely putting the component into the housing part because the mounting part of the holder is attached to the adhered object. As a result, the component does not dangle freely and therefore does not hinder motion. In addition, since the component is housed in the housing part, the component is hardly damaged by contacts with or impacts on other external objects. Accordingly, the outer appearance and functionalities of the component can be maintained excellently. Also, since the component is housed in the housing part, sense of a foreign matter felt through the skin can be reduced even if the component is made of hard material. Particularly, since the component and the holder are formed separate from each other, if soft material such as rubber is used for the housing part, the component is covered with the soft rubber, which more reduces the sense of a foreign matter felt through the skin.

Since the component requires no additional structure for attaching the component to the adhered object, a conventional component can be used. In addition, the holder is constituted by a housing part and a mounting part which have relatively simple structures. Therefore, the whole structure is simple so that labor for molding can be reduced.

In the holder according to the present invention, preferably, the housing part has a housing space for housing the component, the housing space being formed in a pocket-like shape having an opening on one end thereof.

With this arrangement, the housing part is formed in a pocket-like shape. Therefore, the component can be easily held and put into the housing space through the opening.

In the holder according to the present invention, preferably, the housing part has a housing space for housing the component, and has, in the housing space, an opening continuously penetrating in a direction in which the component is inserted to be housed therein.

With this arrangement, the housing part is formed in a shape having a penetrating opening. Therefore, when taking the component out of the housing part, the component can be easily taken out through one opening by applying a force to push out the component through another opening. Further, the component can be housed in the housing part even when the component has, for example, a long narrow shape. Thus, the housing part can house various components of various shapes.

In the holder according to the present invention, preferably, the housing part has a housing space for housing the component, the housing space being made of a stretchy member having an inner shape which has a slightly smaller dimension than an outer shape of the component.

With this arrangement, the part forming the housing space is a stretchy member, and the housing space has an inner shape which has a slightly smaller dimension than the outer shape of the component. Therefore, when the component is housed in the housing space, the housing space expands to tightly fit the outer surface of the component. At this time, the stretchy characteristic of the stretchy member acts on the component, so that the holding force of the housing part to hold the component can be increased. That is, the component hardly falls off.

In the holder according to the present invention, preferably, the component has an operation part, and the housing part holds the component so as to allow the component to be housed therein, with the operation part being exposed.

With this arrangement, the component (such as a cord fastener can be fixed to an arbitrary position of a cord, or a buckle which can connect/disconnect ends of two cords has an operation part) is held so as to be housed in housing part with the operation part being exposed from the housing part, therefore operations can be carried out with the component housed in the housing part.

In the holder according to the present invention, preferably: the component is a cord fastener including a socket and a plug, the plug being contained in the socket in a state that the plug is biased by a biasing unit toward the direction in which the plug projects out from the socket, and the plug also being possible to be pressed into the socket against the biasing unit; the socket is formed with a first cord insertion hole penetrating through a plug insertion hole, into which the plug is inserted; the plug is formed with the operation part on an end thereof, and a second cord insertion hole which communicates with the first cord insertion hole when the plug is pressed into the socket by a predetermined amount; and the housing part holds the cord fastener so as to allow the cord fastener to be housed therein, with the operation part of the plug being exposed.

With this arrangement, when the plug is pushed by a finger into the socket by a predetermined amount, the second cord insertion hole communicates with the first cord insertion hole, so that the cord inserted through these first and second cord insertion holes can be moved smoothly. After moving the cord fastener to an arbitrary position, the finger is put off from the operation part of the plug, to release the plug from the pushed state. Then, the plug is projected out of the socket by the biasing unit, and the second cord insertion hole is shifted off from the first cord insertion hole. The cord is thereby pinched between the first and second cord insertion holes, so that the cord fastener can be fixed to the arbitrary position. Next, the cord fastener fixed to the cord is set in the housing part of the holder which has been attached in advance to the adhered object. The cord fastener can thereby be held on the adhered object.

Since the housing part houses the socket with the operation part of the plug exposed, the operation part of the plug can be easily operated with fingers. That is, the cord fastener is easy to use.

In the holder according to the present invention, preferably, the holder has a third cord insertion hole which communicates with the first cord insertion hole when the socket of the cord fastener is housed in the housing part.

With this arrangement, the cord inserted through the first and second cord insertion holes of the cord fastener is also inserted through the third cord insertion hole of the holder. In this manner, the cord fastener can be moved along the cord, with the cord fastener housed in the housing part, and the cord fastener is prevented from falling off from the housing part. In addition, the cord is prevented from being pinched between the cord fastener and the housing part, by making the third cord insertion hole communicate continuously with the first and second cord insertion holes. Therefore, the cord fastener can be moved smoothly and can be easily held in the housing part.

In the holder according to the present invention, preferably, the third cord insertion hole is constituted by a mounting-part-side cord insertion hole penetrating the mounting part, and a housing-part-side cord insertion hole penetrating the housing part facing to the mounting-part-side cord insertion hole.

With this arrangement, a draw-out hole of the adhered object is covered by the holder when the mounting part is attached to the adhered object with the mounting-part-side cord insertion hole aligned with the draw-out hole of the adhered object. Therefore, the outer appearance of the adhered object can be improved. In addition, since the mounting-part-side cord insertion hole and the housing-part-side cord insertion hole are formed to face each other, the cord fastener can be moved smoothly.

In the holder according to the present invention, preferably, the mounting part has a mounting groove formed in a surface thereof opposite to the surface opposed the adhered object, and the holder is sewn on the adhered object by use of the mounting groove.

With this arrangement, since the mounting part is thinner at the mounting groove, the mounting part can be easily sewn if the mounting part is sewn along the mounting groove with a sewing thread. Thus, the holder can be easily attached to the adhered object.

DETAILED DESCRIPTION OF PREFERRED EMBODIMENTS

Hereinafter, embodiments of the present invention will be described on the basis of appended drawings. In the following description of the embodiments, identical constitutional elements will be denoted respectively at identical reference symbols, and a reiterative description thereof will be avoided.

First Embodiment

Figure 1:
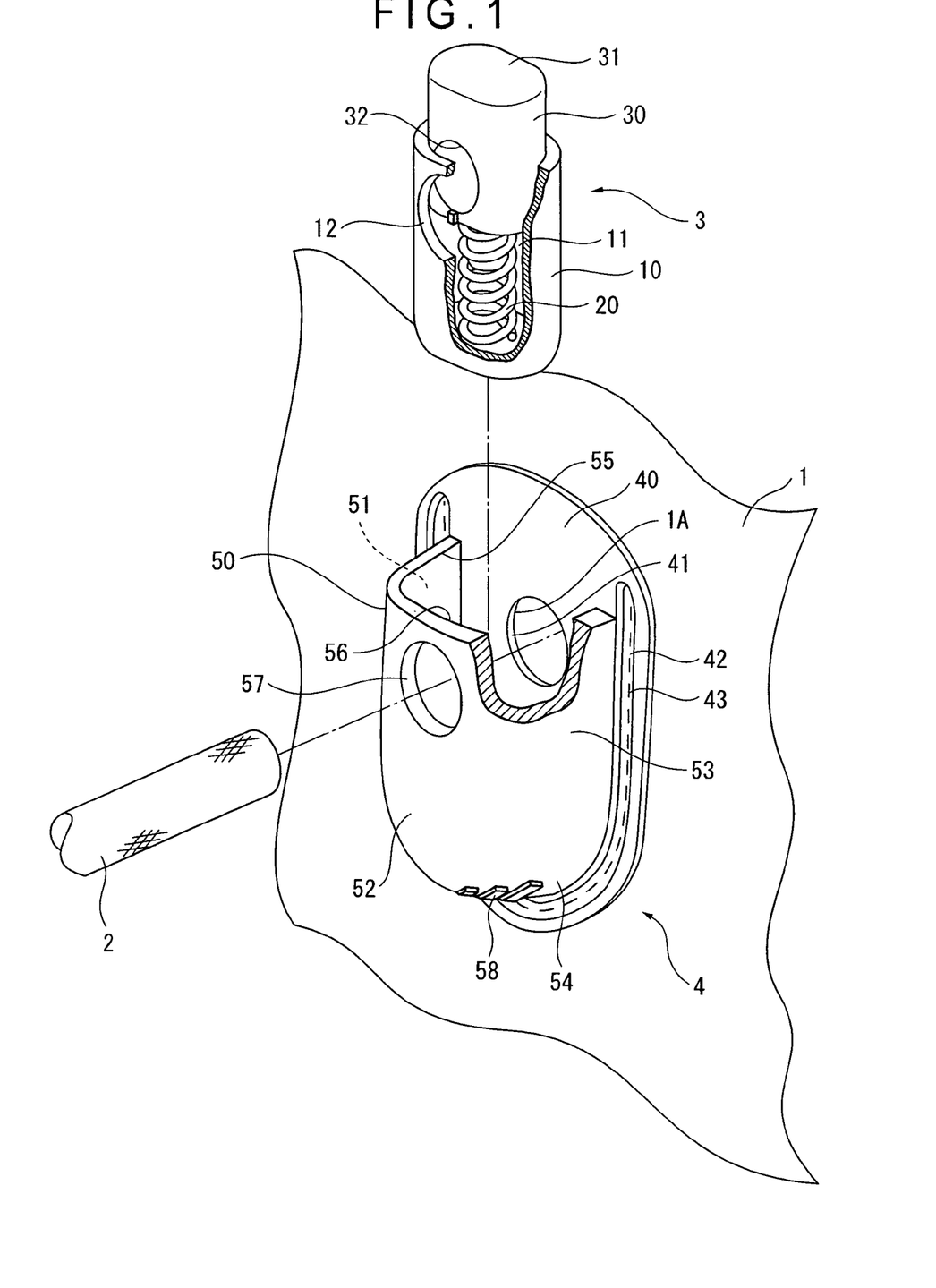
FIG. 1 is a perspective view showing a holder and a cord fastener according to the first embodiment of the present invention.
Figure 2:
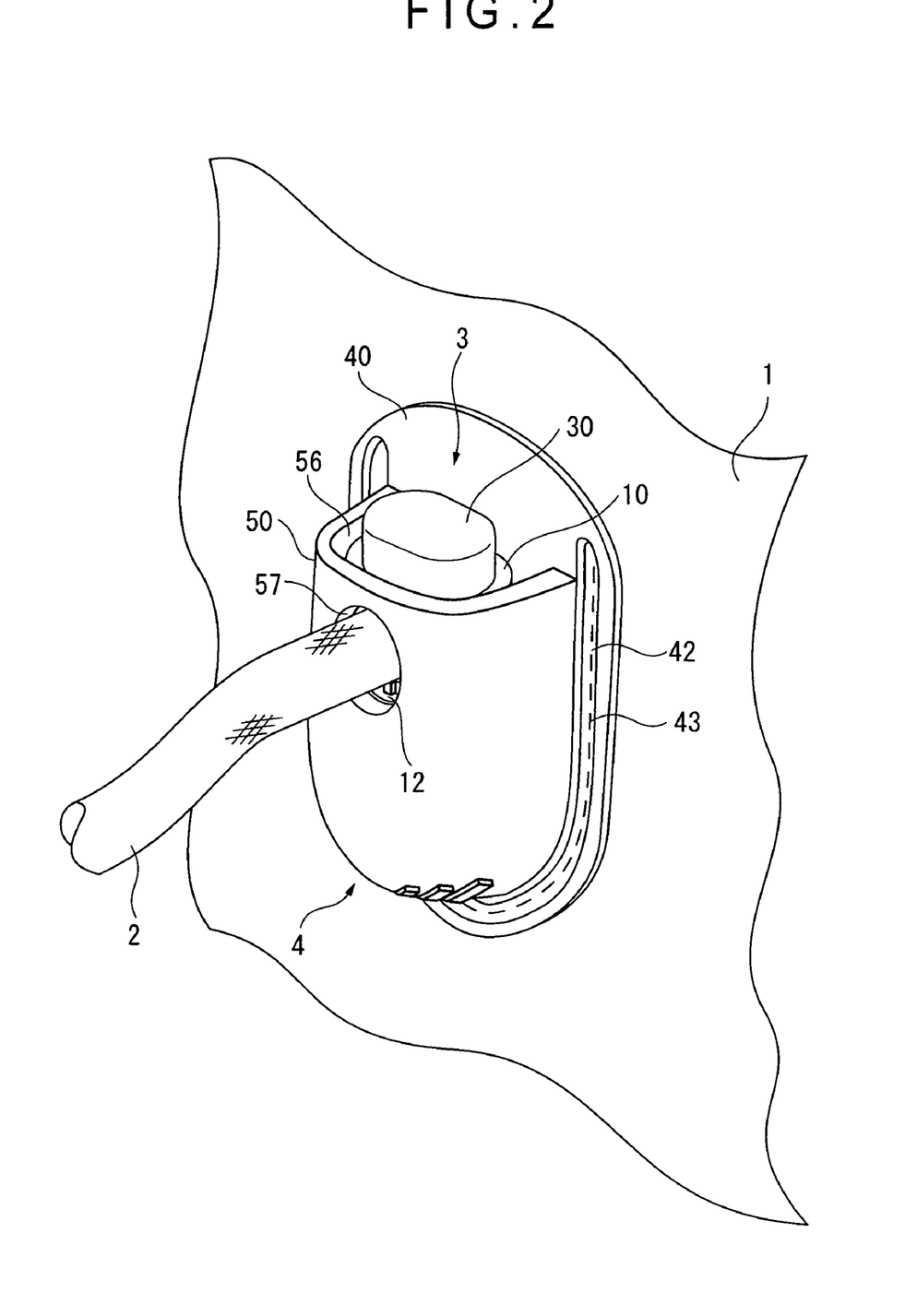
FIG. 2 is a perspective view showing a state in which the cord fastener is housed in the holder according to the embodiment, and a cord is inserted.
Figure 3:
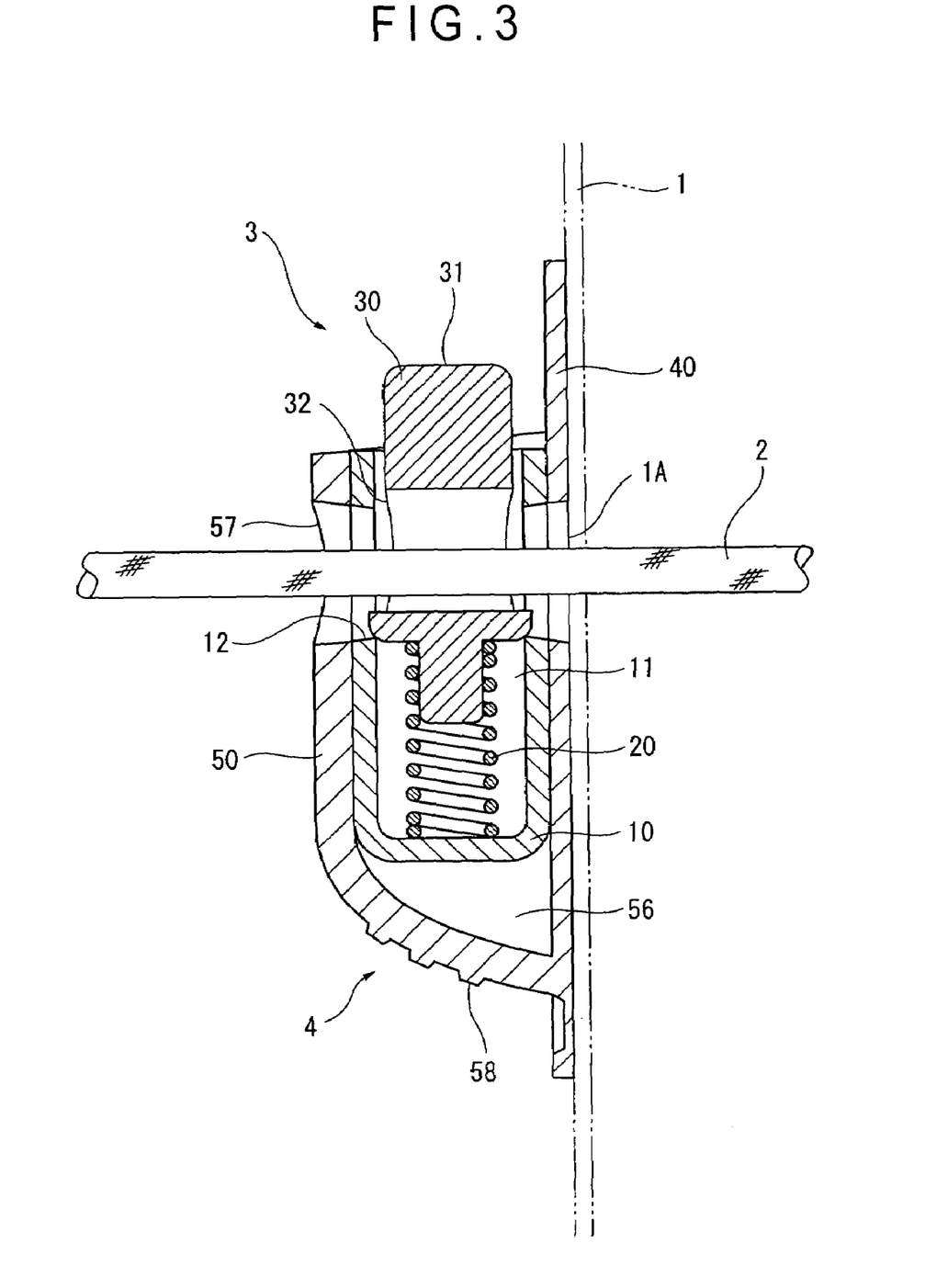
FIG. 3 is a cross-sectional view of the cord fastener and the holder during movement thereof relative to the cord, in the embodiment.
Figure 4:
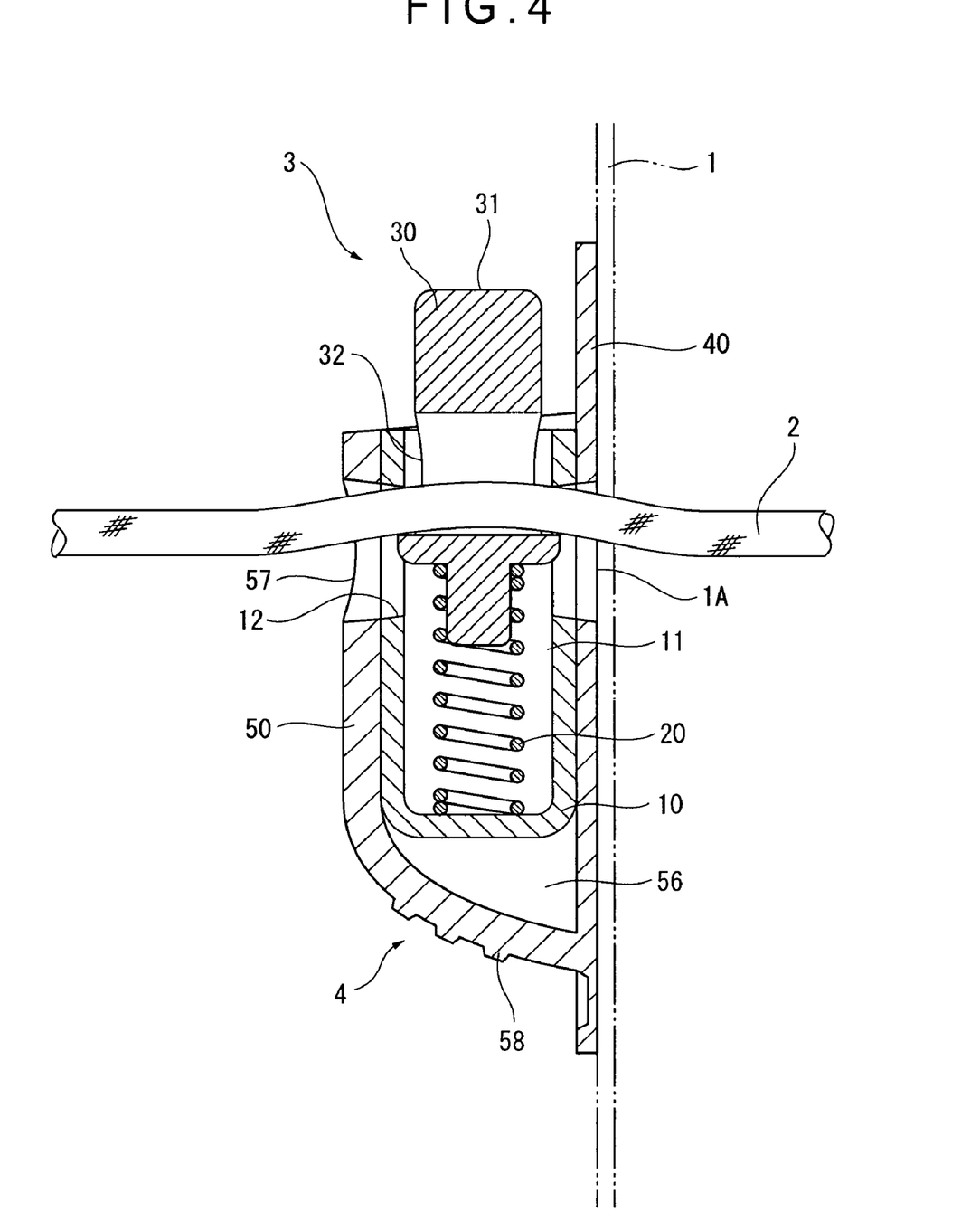
FIG. 4 is a cross-sectional view of the cord fastener and the holder fixed to the cord, in the embodiment.

FIGS. 1 to 4 show the first embodiment. FIG. 1 is a perspective view showing a holder and a cord fastener. FIG. 2 is a perspective view showing a state in which the cord fastener is housed in the holder and a cord is inserted. FIG. 3 is a cross-sectional view of the cord fastener and holder which are moving relative to the cord. FIG. 4 is a cross-sectional view showing the cord fastener and holder fixed to the cord.

The holder 4 in the first embodiment, as shown in FIG. 1, functions to hold a cord fastener 3 as a component equipped on a cord 2 of an adhered object 1 such as a garment, on the adhered object 1.

The cord 2 is provided along an opening edge such as a cuff, if the adhered object 1 is a garment. The cord 2 penetrates through a draw-out hole 1A formed in the adhered object 1, and an end of the cord 2 is drawn out of the adhered object 1.

The cord fastener 3 is constituted by a cylindrical socket 10 and a plug 30. The plug 30 is contained so as to be biased toward the projection direction by a spring 20 as a biasing unit included in the socket 10 and to be able to be pressed in against the spring 20.

The socket 10 is made of polyacetal, polyamide, polypropylene, ABS resins, polycarbonate, or the like. The socket 10 has a plug insertion hole 11 in which the plug 30 is inserted, and a first cord insertion hole 12 formed in a direction vertical to the adhered object 1 through the plug insertion hole 11. The plug insertion hole 11 has an inner surface shape which substantially coincides with the outer surface shape of the plug 30.

The spring 20 is contained at the bottom of the plug insertion hole 11 and applies biasing force in a direction in which the plug 30 projects from the socket 10.

The plug 30 is made of polyacetal, polyamide, polypropylene, ABS resins, polycarbonate, or the like, and has an operation part 31 and a second cord insertion hole 32. The operation part 31 is formed at an end opposite to another end which is inserted into the plug insertion hole 11, and is applied with a pressing force by a finger or the like. The second cord insertion hole 32 communicates with the first cord insertion hole 12 when the plug 30 is pressed by a predetermined amount into the socket 10.

The holder 4 is formed by injection molding from resins such as urethane, and is constituted by a thin disk-like mounting part 40 and a pocket-like housing part 50. The mounting part 40 is attached to the adhered object 1. The housing part 50 is formed integrally on a surface of the mounting part 40 opposite to another surface thereof facing the adhered object 1. The housing part 50 covers and houses the cord fastener 3.

The mounting part 40 is provided with a mounting-part-side cord insertion hole 41 and a mounting groove 42. The mounting-part-side cord insertion hole 41 is penetrated and formed at a substantial center of the surface, in a direction vertical to the adhered object 1. The mounting groove 42 is formed along side and lower edges of a surface of the mounting part 40 which is opposite to the surface thereof facing the adhered object 1. In the mounting groove 42, the mounting part 40 is stitched up on the adhered object 1 with a sewing thread 43.

The housing part 50 is formed like a pocket, constituted by a right side wall 51, front wall 52, left side wall 53, and bottom wall 54, and has an opening 55 and a housing space 56. The opening 55 is in the upper surface of the pocket, and allows the cord fastener 3 to be taken in and out. The housing space 56 which serves like a pocket houses the cord fastener 3. The operation part 31 of the plug 30 is exposed from the opening 55. That is, these walls 51 to 54 together with the mounting part 40 cover the whole surfaces of the cord fastener 3 except the operation part 31 of the plug 30.

A housing-part-side cord insertion hole 57 is formed at the substantial center of the front wall 52, penetrated in a direction vertical to the adhered object 1. The bottom wall 54 has a curved shape, and has a finger stopper 58 in form of wavy concaves/convexes on the outer surface of the bottom wall. When the plug 30 is pushed into the socket 10 with a finger, another finger is put on the finger stopper 58, and thus, the finger stopper 58 serves as a slip stopper.

The housing space 56 has an inner surface shape which substantially coincides with the outer surface shape of the cord fastener 3.

A method of attaching the holder 4 to the adhered object 1 and a method of putting in the cord fastener 3 in the holder 4 will now be described.

To attach the holder 4 to the adhered object 1, the mounting part 40 is let contact the adhered object 1, with the mounting-part-side cord insertion hole 41 is inserted through the draw-out hole 1A of the adhered object 1. In this state, the mounting part 40 is stitched up on the adhered object 1 along the mounting groove 42 with the sewing thread 43.

To put the cord fastener 3 in the holder 4 with the cord 2 inserted, the cord fastener 3 is put into the housing part 50 of the holder 4, firstly, such that the first cord insertion hole 12 communicates continuously with the mounting-part-side cord insertion hole 41 and the housing-part-side cord insertion hole 57. Next, the operation part 31 of the plug 30 is pushed toward the socket 10 to make the second cord insertion hole 32 communicate continuously with the first cord insertion hole 12. At this time, all of the draw-out hole 1A, first cord insertion hole 12, second cord insertion hole 32, mounting-part-side cord insertion hole 41, and housing-part-side cord insertion hole 57 communicate with each other. The cord 2 of the adhered object 1 is inserted into every one of the holes in a direction from the draw-out hole 1A, and is drawn out from the housing-part-side cord insertion hole 57. Then, the whole components are in the state shown in FIG. 2. A stopper such as a knot is tied at an end of the cord 2 thus drawn out.

However, procedures of the methods of attaching and putting in are not limited to those described above. That is, the holder 4 may be attached to the adhered object 1 after the cord 2 is inserted through the cord fastener 3 and holder 4.

With reference to FIGS. 3 and 4, a usage of the cord fastener 3 held on the adhered object 1 will be described.

At first, for example, a forefinger is put on the finger stopper of the housing part 50 of the holder 4, and a thumb is put on the operation part 31 of the plug 30. Then, both of the housing part 50 and plug 30 are pushed against each other, to press the plug 30 into the socket 10 by a predetermined amount. As shown in FIG. 3, the first cord insertion hole 12 and the second cord insertion hole 32 which have been pinching the cord 2 are aligned with each other. Since the cord 2 is thereby released from the pinched state, the cord 2 which penetrates through the cord fastener 3 and the holder 4 can then be moved smoothly. By drawing out the cord 2 through the housing-part-side cord insertion hole 57, the opening of the adhered object 1 provided with the cord 2 can be tightened. On the other side, by drawing in the cord 2 into the adhered object 1 through the housing-part-side cord insertion hole 57, the opening of the adhered object 1 can be loosened.

After the opening of the adhered object 1 comes into a state aimed at, the finger is put off of the operation part 31 of the plug 30. Then, as shown in FIG. 4, the plug 30 is moved by the spring 20 in a direction in which the plug 30 projects from the socket 10. Accordingly, the second cord insertion hole 32 shifts out of the first cord insertion hole 12. The first and second cord insertion holes 12 and 32 pinch and fix the cord 2 inserted, so that the cord 2 is fixed by the cord fastener 3.

According to the first embodiment, the following functions and advantages are achieved.

(1) Since the holder 4 is attached to the adhered object 1, the cord fastener 3 is fixed to the adhered object 1 by merely putting in the cord fastener 3 into the housing part 50. Accordingly, the cord fastener 3 does not dangle in the middle of the cord 2 or hinder motions.

(2) Because of the ground described above in (1), the cord fastener 3 and the cord 2 do not dangle together. In addition, the whole surfaces of the cord fastener 3 except the operation part 31 of the plug 30 are covered with the holder 4. Accordingly, the cord fastener 3 is hardly damaged due to contacts with or impacts on other external objects. Thus, the outer appearance and functionalities can be maintained.

(3) Except the operation part 31 of the plug 30, the whole surfaces of the cord fastener 3 which is hard is covered with the holder 4 made of relatively soft material such as polyurethane elastomer, olefin-based elastomer, polyester-based elastomer, or the like. It is therefore possible to reduce a sense of foreign matter when human skin contacts the cord fastener 3 directly or indirectly through the adhered object 1.

(4) The cord fastener 3 need not be added with a particular structure to attach the cord fastener 3 to the adhered object 1. Therefore, a conventional cord fastener can be used as the cord fastener 3.

(5) The holder 4 is constituted by the housing part 50 and the mounting part 40 which have a relatively simple structure. Accordingly, the holder 4 has a simple structure and requires less labor for molding.

(6) The cord fastener 3 can be taken in and out of the housing part 50 of the holder 4. Hence, the cord fastener 3 can be pulled out of the housing part 50, to adjust the cord 2. After the adjustment, the cord fastener 3 can be set again in the housing part 50. For example, the cord fastener 3 can be easily handled even when the cord fastener 3 is held at a location such as a cuff where the cord fastener 3 is difficult to use.

(7) Since the housing part 50 is formed in a pocket-like shape having a housing space 56, the cord fastener 3 can be easily held, and the cord fastener 3 can be easily taken in and out of the opening 55.

(8) The inner surface shape of the housing space 56 coincides with the outer surface shape of the cord fastener 3. Therefore, the cord fastener 3 does not rattle while the cord fastener 3 is housed in the housing space 56. Besides, the cord fastener 3 can be easily taken in and out.

(9) The housing part 50 houses the socket 10 with the operation part 31 of the plug 30 exposed. Therefore, the operation part 31 of the plug 30 can be easily operated with a finger, i.e., the cord fastener 3 can be easily used or handled.

(10) The cord 2 inserted through the first and second cord insertion holes 12 and 32 of the cord fastener 3 is also inserted through the mounting-part-side cord insertion hole 41 and the housing-part-side cord insertion hole 57 of the holder 4. In this manner, the cord fastener 3 can be moved along the cord 2, with the cord fastener 3 housed in the housing part 50.

(11) As described above, the cord 2 inserted through the first and second cord insertion holes 12 and 32 of the cord fastener 3 is also inserted through the mounting-part-side cord insertion hole 41 and the housing-part-side cord insertion hole 57 of the holder 4. In this manner, the cord fastener 3 is prevented from falling from the housing part 50.

(12) Also as described above, the cord 2 inserted through the first and second cord insertion holes 12 and 32 of the cord fastener 3 is also inserted through the mounting-part-side cord insertion hole 41 and the housing-part-side cord insertion hole 57 of the holder 4. In this manner, the cord 2 is prevented from being pinched between the cord fastener 3 and the housing part 50. Therefore, the cord fastener 3 can be moved smoothly, and can be easily held in the housing part 50.

(13) The mounting-part-side cord insertion hole 41 is formed in the mounting part 40. Hence, if the mounting part 40 is attached to the adhered object 1 with this mounting-part-side cord insertion hole 41 aligned with the draw-out hole 1A of the adhered object 1, the draw-out hole 1A is covered by the holder 4. Accordingly, the outer appearance of the adhered object 1 can be improved.

(14) The mounting-part-side cord insertion hole 41 and the housing-part-side cord insertion hole 57 are formed to be opposed to each other. Therefore, the cord 2 becomes linear within the housing space 56 when the cord fastener 3 moves. As a result, the cord fastener 3 can be moved smoothly.

(15) Since the mounting groove 42 of the mounting part 40 is thinner than the other parts of the mounting part 40, the mounting part 40 can be easily sewn with the sewing thread 43 along the mounting groove 42. That is, the mounting groove 42 can be easily attached to the adhered object 1.

Second Embodiment

Figure 5:
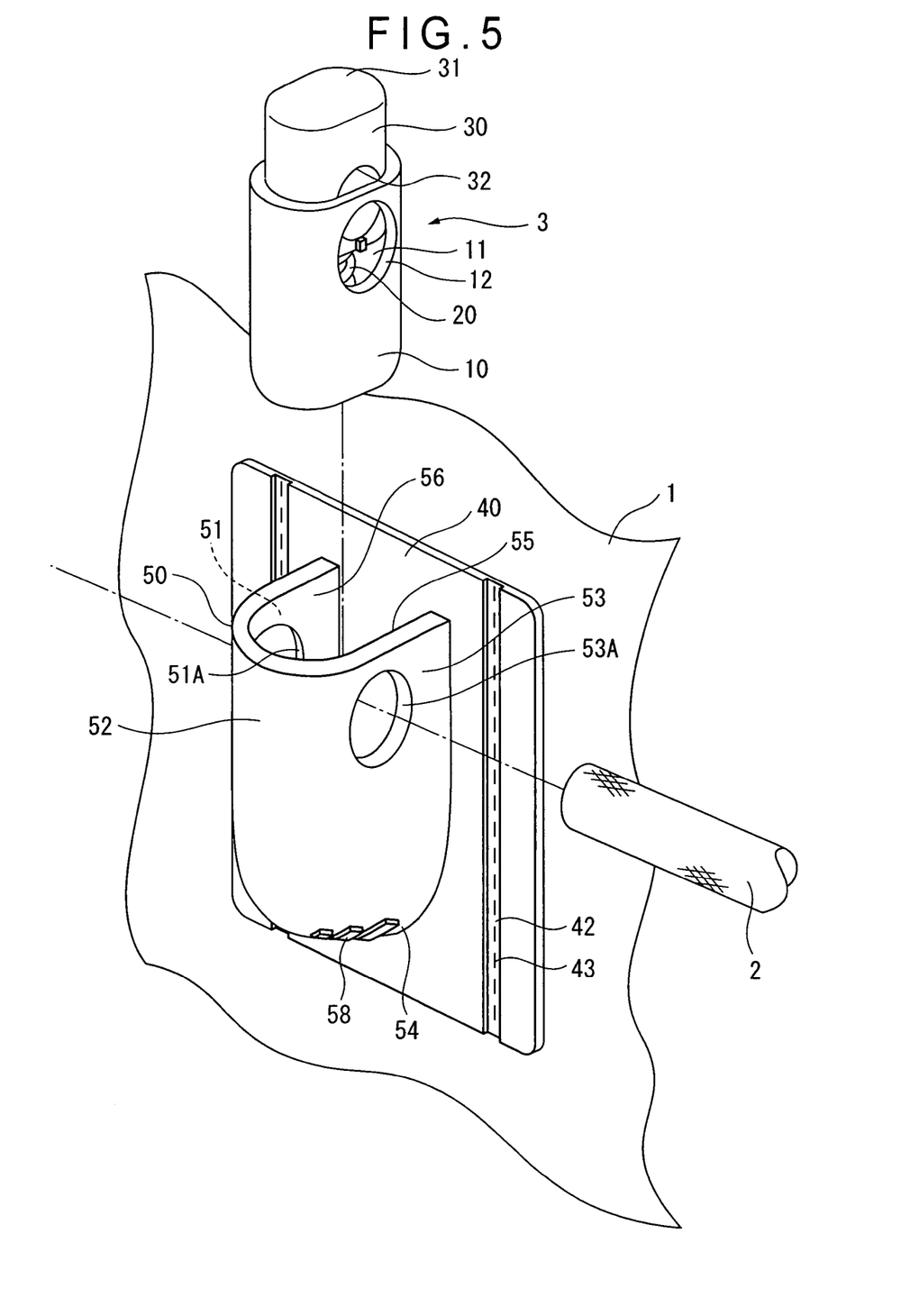
FIG. 5 is a perspective view showing a holder and a cord fastener according to the second embodiment of the present invention.

FIG. 5 is a perspective view showing a holder and a cord fastener according to the second embodiment of the present invention.

The cord fastener 3 according to the second embodiment is not held on an opening of an adhered object 1 equipped with a cord 2, but is held on the adhered object 1 in the middle of the cord 2 drawn out of the adhered object 1.

Therefore, the holder 4 of the second embodiment is not attached so as to cover the draw-out hole 1A of the adhered object 1, unlike the first embodiment.

The holder 4 according to the second embodiment differs from the holder 4 according to the first embodiment in the point as follows. The mounting-part-side cord insertion hole 41 and housing-part-side cord insertion hole 57 as shown in the first embodiment are not formed in the holder 4 of the second embodiment. In place of these holes, a right-side wall cord insertion hole 51A and a left-side wall cord insertion hole 53A are formed respectively in right and left side walls 51 and 53 of the housing part 50. Each of the holes 51A and 53A is formed and penetrated in a direction parallel to the adhered object 1. Mounting grooves 42 of the mounting part 40 are formed linearly along both side edges of a surface of the mounting part 40 which is opposite to another surface contacting the adhered object 1. The housing part 50 has an opening 55 which is shaped in a semi-circular shape such that the cord fastener 3 can be easily held.

Due to this structure, the cord fastener 3 is housed in the housing part 50 such that the first cord insertion hole 12 communicates continuously with the right-side wall cord insertion hole 51A and the left-side wall cord insertion hole 53A. The cord 2 is inserted through the first and second cord insertion holes 12 and 32 and the right- and left-side wall cord insertion hole 51A and 53A, i.e., in a direction parallel to the adhered object 1.

According to the second embodiment, the following function and advantage are obtained in addition to the above-described functions and advantages (1) to (12), (14), and (15) obtained according to the first embodiment.

(16) Since the right-side wall cord insertion hole 51A and left-side wall cord insertion hole 53A are formed in the housing part 50, the cord 2 can be inserted in a direction parallel to the adhered object 1. Therefore, a part of the cord 2 which is exposed outside from the adhered object 1 can be equipped with the cord fastener 3. The cord fastener 3 thus equipped can be held on the adhered object 1 by the holder 4.

<Modification>

The present invention is not limited to the embodiments described above but includes those modifications and improvements that can be made within a range in which the objects of the present invention can be achieved.

Figure 6:
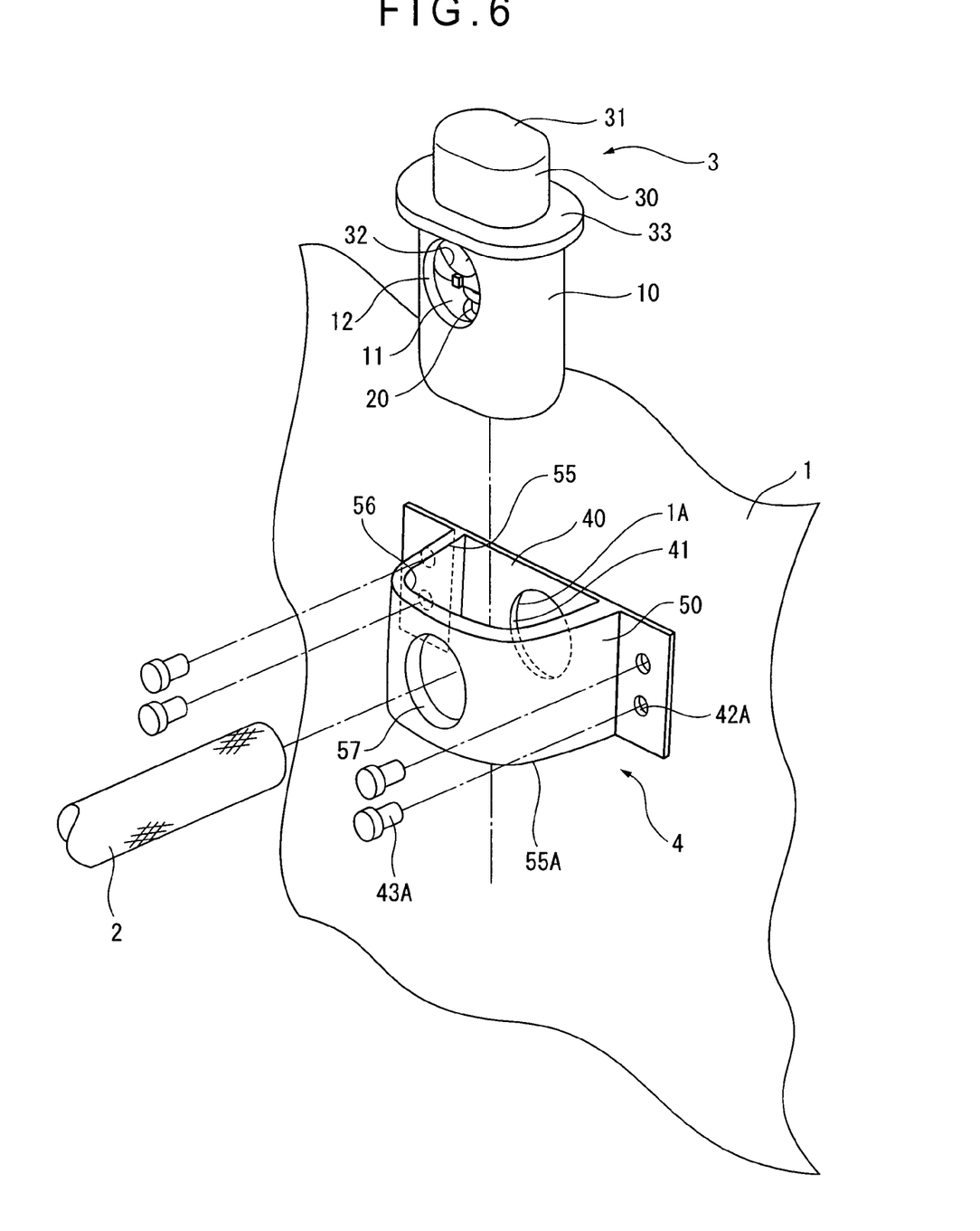
FIG. 6 is a perspective view showing a holder and a cord fastener according to a modification of the present invention.
Figure 7:
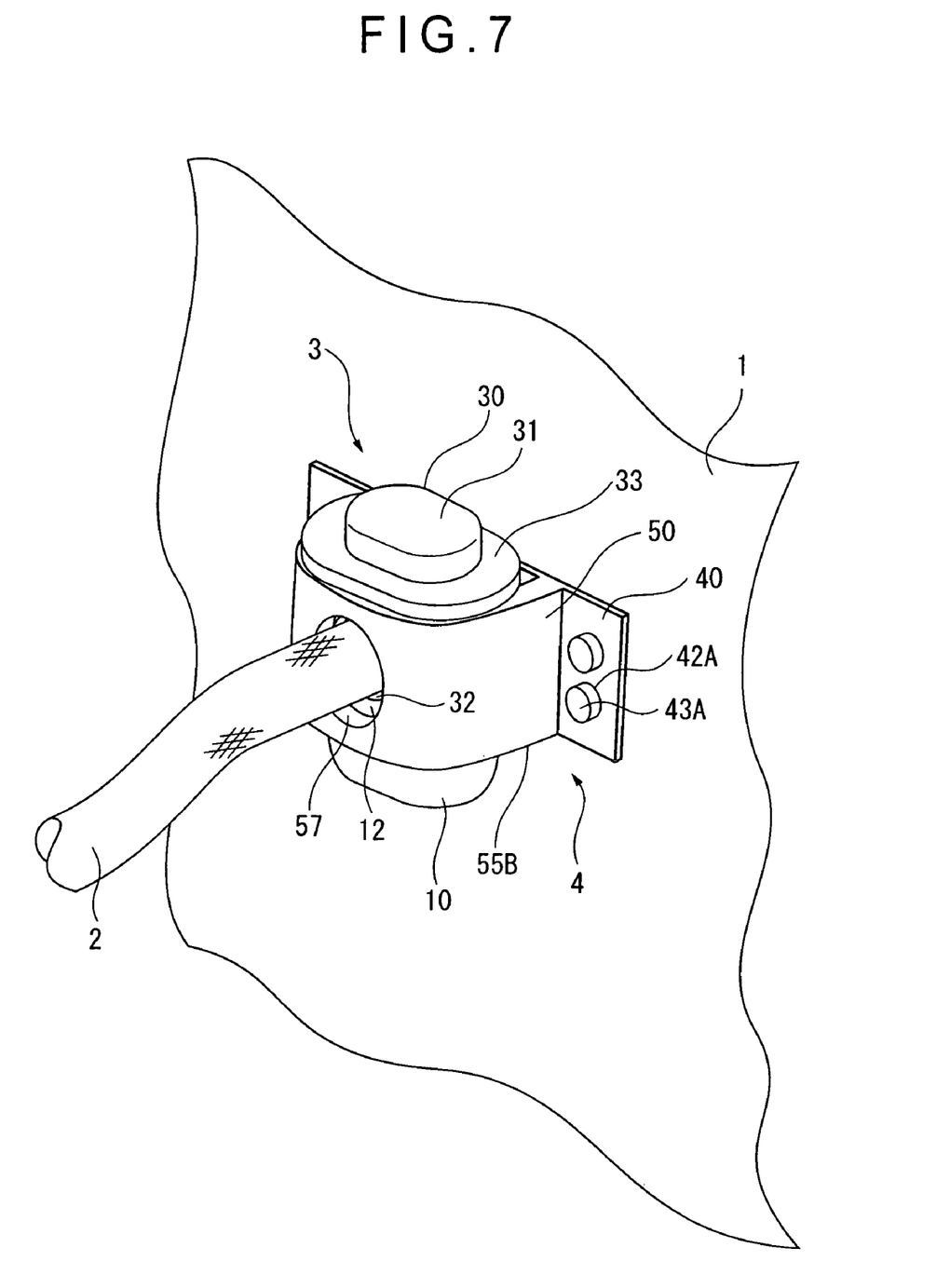
FIG. 7 is a perspective view showing a state in which the cord fastener is housed in the holder (shown in FIG. 6) and a cord is inserted.

In the first and second embodiments, the housing part 50 has a pocket-like shape having one single opening 55. The present invention, however, needs only to be able to hold the cord fastener 3 with the most part of the surface thereof covered. For example, the housing part 50 may have a cylindrical shape having two openings opposed to each other, i.e., an upper opening 55 in an upper surface and a lower opening 55A in a lower surface, as shown in FIG. 6. However, to hold securely the cord fastener 3 in the housing part 50, a flange-like engagement part 33 which spreads outside from the upper circumferential end edge of the socket 10 should desirably be formed on the cord fastener 3. When this cord fastener 3 is put into the housing part 50, the engagement part 33 is stuck to stop on the circumferential edge of the upper opening 55 of the housing part 50, and the cord 2 is inserted through the cord insertion holes 12 and 32 of the cord fastener 3 and through the cord insertion holes 41 and 57 of the housing part 50. Therefore, cord fastener 3 can be securely held in the housing part 50.

The housing part 50 is thus cylindrical. Therefore, the cord fastener 3 can be easily taken out from the upper opening 55, by applying a pressing force to the cord fastener 3 from the lower opening 55A when picking out the cord fastener 3 from the housing part 50. Further, for example, in case where the cord fastener 3 has a long narrow shape, the cord fastener 3 can be housed in the housing part 50. That is, the housing part 50 can house various cord fasteners 3 of various shapes.

In the first and second embodiments, the mounting part 40 is attached to the adhered object 1 by sewing the mounting part 40 with the sewing thread 43 along the mounting groove or grooves 42. In place of this method of attaching the mounting part 40, it is possible to adopt another method as follows. For example, as shown in FIG. 6, mounting holes 42A may be cut in both side edges of the mounting part 40 such that the mounting holes 42A penetrate in a direction vertical to the adhered object 1. A pin-like mounting tool having a sharp tip end, e.g., a rivet 43A may be inserted in each of the mounting holes 42A such that the tip end penetrates the adhered object 1. Thereafter, the tip ends are riveted so that the rivets 43A might not fall off of the adhered object 1. In this manner, the mounting part 40 can be attached to the adhered object 1. Alternatively, there may be another method in which the surface of the mounting part 40 that contacts the adhered object 1 may be welded to the adhered object 1 or bonded thereto by an adhesive agent or the like. If welding or bonding is adopted as a method of attaching the mounting part 40, neither a mounting groove 42 nor a mounting hole 42A needs to be formed in the mounting part 40.

In the present invention, the housing space 56 may be constituted by a stretchy member having an inner shape which has a slightly smaller size than the outer shape of the cord fastener 3. In the case of the structure of this kind, when the cord fastener 3 is housed in the housing space 56, the housing space 56 expands to tightly fit the outer surface of the cord fastener 3. At this time, the stretchy characteristic of the stretchy member acts on the cord fastener 3, so that the housing part 50 can raise its own retaining force to hold the cord fastener 3.

In the first and second embodiments, a finger stopper 58 is formed on the bottom wall 54 of the housing part 50. The present invention, however, needs not always have a finger stopper 58 if the bottom wall 54 has a flat surface, i.e., a shape which is easy for a finger to stop on.

The cord fastener 3 needs not always have a structure as described in the first or second embodiment. For example, in place of the spring 20, an elastic leg member may be formed at the lower end of the plug 30. The structure may be such that the leg member slides on the inner surface of the plug insertion hole 11 of the socket 10, thereby biasing the plug 30.

The cord fastener 3 used in the first and second embodiments is used with one single cord 2 inserted therein. The present invention, however, may use a cord fastener in which two cords 2 are inserted and the cord fastener is moved and fixed relatively to the two cords 2.

Figure 8:
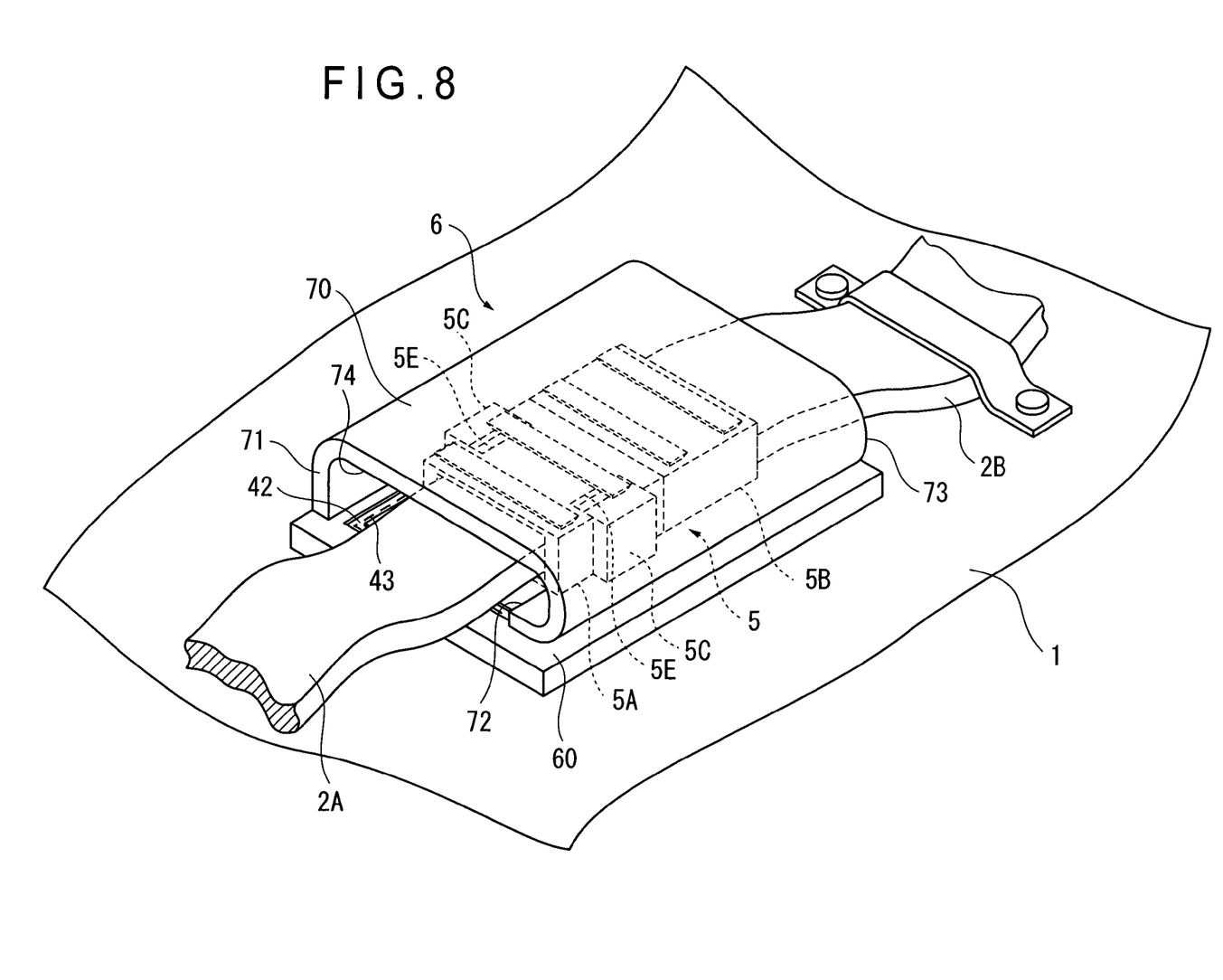
FIG. 8 is a perspective view showing a holder and a buckle according to another modification of the present invention.

Also in the first and second embodiments, the cord fastener 3 is adopted as a component. However, for example, as shown in FIG. 8, it is possible to use a buckle 5 which is equipped on ends of tapes 2A and 2B of an adhered object 1 and is capable of connecting/separating the ends of the tapes 2A and 2B. The tapes 2A and 2B may be wide cords.

The buckle 5 is constituted by a male buckle 5A and a female buckle 5B. These buckles 5A and 5B are respectively equipped on ends of the tapes 2A and 2B. The male buckle 5A is equipped on an end of the tape 2A which freely dangles relatively to the adhered object 1. On the other side, the female buckle 5B is equipped on an end of the tape 2B which is fixed to the adhered object 1. In addition, the male buckle 5A has operation pieces 5C which are provided respectively on both side end surfaces of the buckle 5A, and which serve as operation parts to operate connection/separation with respect to the female buckle 5B. The female buckle 5B has operation openings SE to expose the operation pieces 5C.

A holder 6 which holds the buckle 5 on the adhered object 1 has a thin disk-like mounting part 60, and a housing part 70. The mounting part 60 is attached to the adhered object 1. The housing part 70 is formed on a surface of the mounting part 60 which is opposite to another surface facing the adhered object 1. The housing part 70 houses the buckle 5 with the buckles 5A and 5B connected to each other. The holder 6 is made of an elastic member, and is attached to the surface of the adhered object 1 which the female buckle 5B contacts.

A mounting groove 42 is formed in a peripheral edge of a surface of the mounting part 60 which is opposed to another surface thereof facing the adhered object 1. The housing part 70 is connected to the mounting part 60 by a connection part 71 such that the part 70 is openable/closable with respect to the mounting part 60. The housing part 70 further has an opening 72 to set in and out the buckle 5, and two tape insertion holes 73 and 74 opposed to each other. Also, the housing part 70 is formed to have a C-shaped cross-section.

With this arrangement, the female buckle 5B is set in advance in the housing part 70 through the tape insertion hole 73. The male buckle 5A is inserted from the tape insertion hole 74, and engaged with the female buckle 5B inside the housing part 70. In this manner, the buckle 5 in the engaged state is housed in the housing part 70. Since the mounting part 60 is attached to the adhered object 1, the buckle 5 can be held on the adhered object 1. Even at this time, the buckle 5 can be touched directly with fingers through the opening 72, and so, the buckle 5 is easy to deal with. Further, because of the elasticity of the holder 6, the connection part 71 is deformable depending on a force applied. For example, when manually connecting the buckles 5A and 5B, the housing part 70 can be lifted to open and widen the opening 72. The buckle 5 is thus easy to operate. When no force is acting on the connection part 71, the housing part 70 is kept covering the mounting part 60, so that the buckle 5 housed in the housing part 70 can always be covered.

Figure 9:
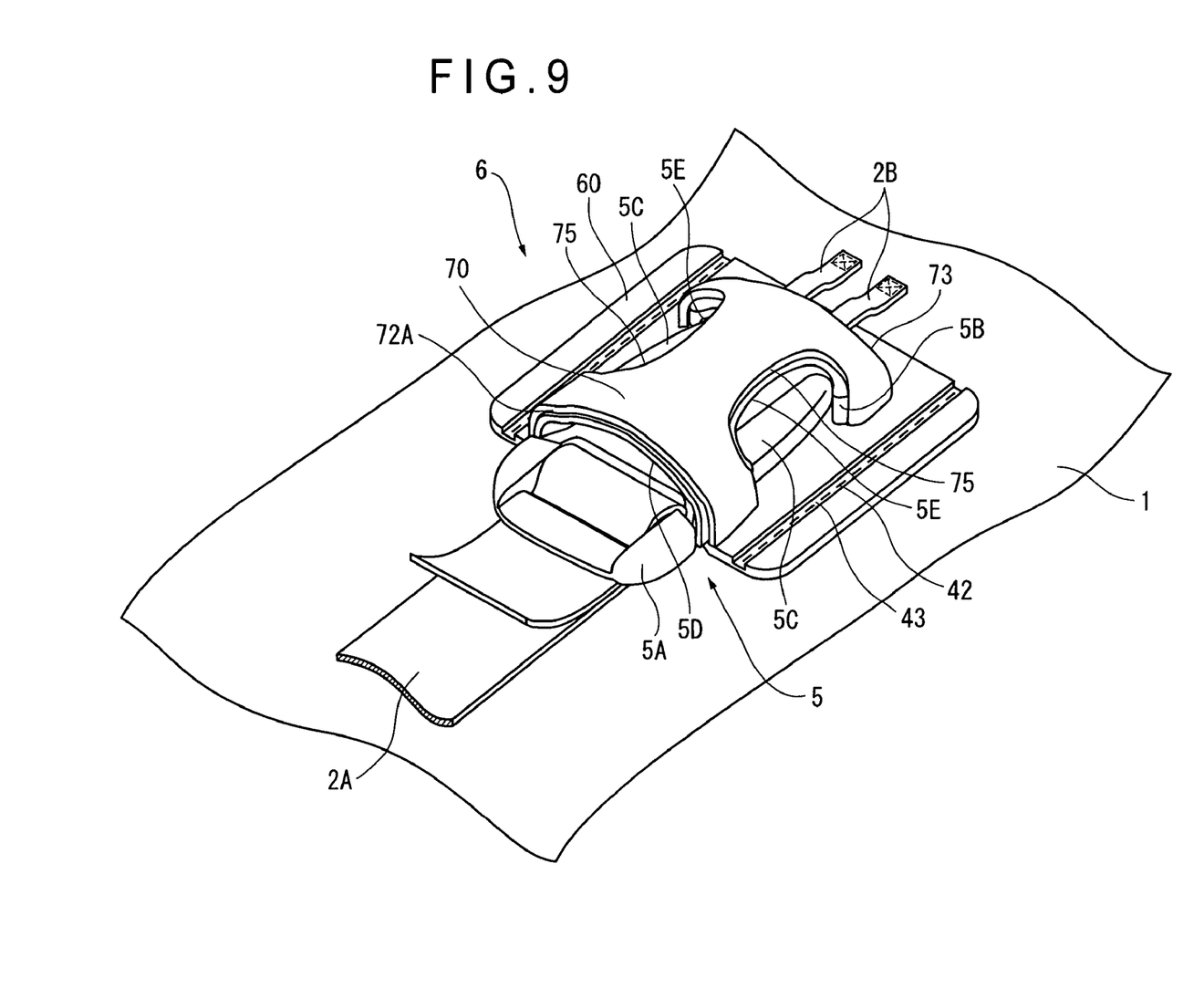
FIG. 9 is a perspective view showing a holder and a buckle which are different from those shown in FIG. 8.

The holder 6 is not limited to the structure as described above. For example, the structure may arranged such that the housing part 70 is formed to be thinner at parts corresponding to the operation pieces 5C, so that the operation pieces 5C can be operated over the housing part 70. In addition, the end of the tape 2B on which the female buckle 5B is equipped need not be fixed to the adhered object 1. That is, after the buckles 5A and 5B are connected with each other, the buckle 5 may be moved to the position where the holder 6 is attached, to be housed in the housing part 70. Alternatively, in another example, the housing part 70 may function to fix and hold the female buckle 5B, covering the buckle 5B, as shown in FIG. 9. In the case of the buckle 6 shown in FIG. 9, however, operation pieces 5C are formed on the male buckle 5A. The housing part 70 of the holder 6 in this example has an opening 72A and operation holes 75. The opening 72A has an inner surface shape which substantially coincides with the outer shape of the female buckle 5B. The opening 72A also corresponds to an engagement port 5D of the female buckle 5B into which the male buckle 5A is inserted. The operation holes 75 correspond, respectively on both sides, to the operation pieces 5C so that the operation pieces 5C are contained, exposed to the outside. Also, the operation holes 75 respectively have almost the same shapes as operation openings SE.

The tapes 2A and 2B may be parts of one tape which have two ends respectively equipped with the male and female buckles 5A and 5B.

Figure 10:
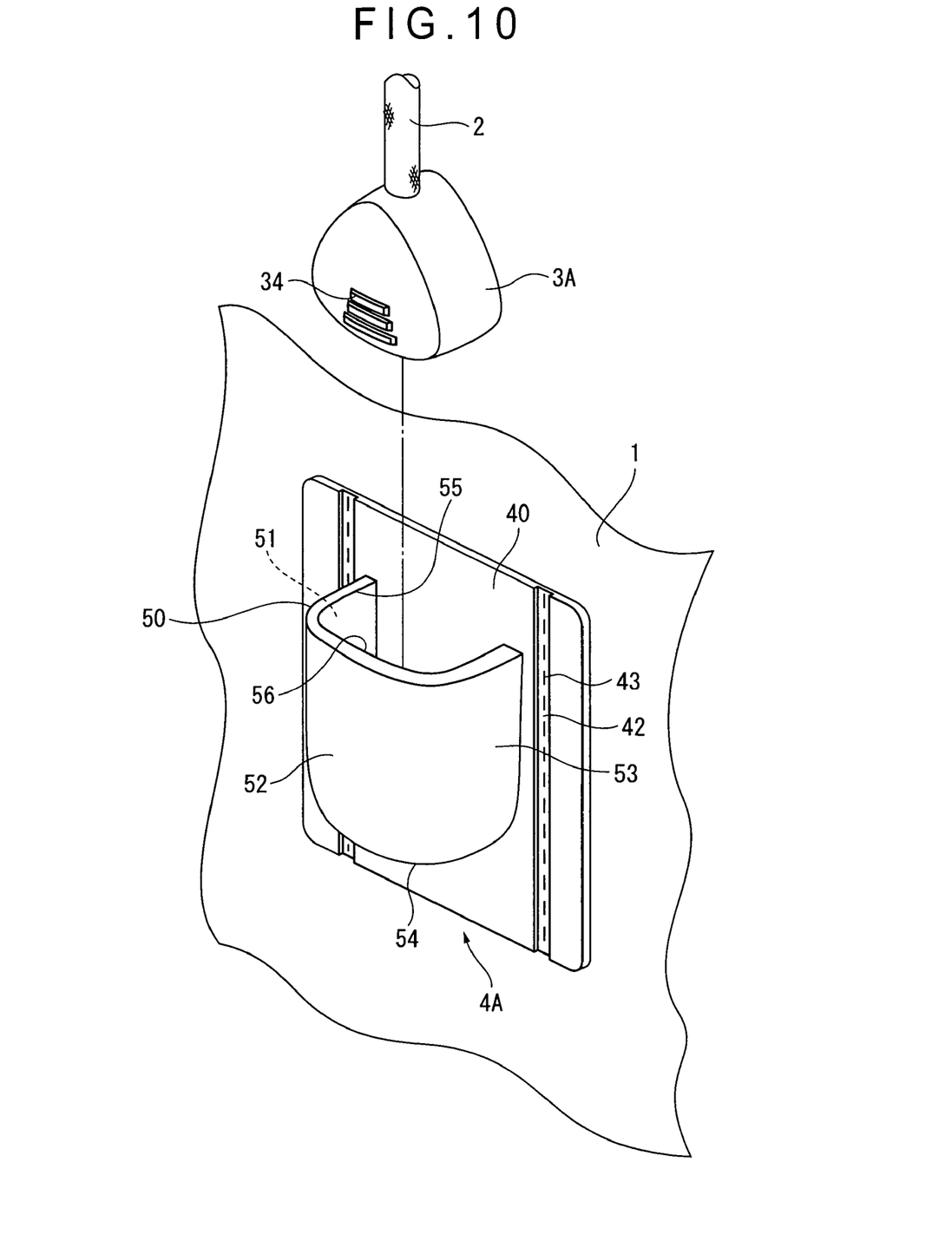
FIG. 10 is a perspective view showing a holder and a cord end attachment according to another modification of the present invention.

The component is not limited to those described above, for example, as long as the component is attached to a cord 2 equipped on an adhered object 1 and has predetermined functions for the adhered object 1. For example, as shown in FIG. 10, the component may be a cord stopper to prevent the cord 2 from falling off or may be a cord-end attachment 3A attached as an ornament to an end of the cord 2. At this time, the holder 4A houses and holds the cord-end attachment 3A such that the cord 2 to which the cord-end attachment 3A is attached extends out through the opening 55. As a result, cord insertion holes need not be formed in the walls 51 to 54 of the holder 4A. Alternatively, a bumpy part 34 may be formed on a surface of the cord-end attachment 3A, so that a finger or the holder 4A can be easily caught and stop on that part. With this arrangement, the cord-end attachment 3A does not dangle at the end of the cord 2.

The priority application Number JP2004-312825 upon which this patent application is based is hereby incorporated by reference.

What is claimed is:

1. A holder for a cord fastener attached to a cord of an adhered object, the holder holding the cord fastener on the adhered object, the cord fastener including an operation part; a socket; and a plug with the operation part formed on an end thereof, the plug being contained in the socket in a state that the plug is biased by a biasing unit toward a direction in which the plug projects out from the socket, the plug being pressed into the socket against the biasing unit, the cord fastener further including: a first cord insertion hole formed on the socket, the first cord insertion hole penetrating through a plug insertion hole, into which the plug is inserted; and a second cord insertion hole formed on the plug, the second cord insertion hole communicating with the first cord insertion hole when the plug is pressed into the socket by a predetermined amount, the holder comprising:
a mounting part attached to the adhered object, the mounting part having a mounting groove formed along lateral sides and a lower side of a surface thereof opposite to the surface opposing the adhered object;
a housing part provided on the mounting part, the housing part having a housing space to hold and house the cord fastener with the operation part being exposed, the housing space being defined by side walls, a front wall, a bottom wall and an opening formed on one end thereof; and
a third cord insertion hole which communicates with the first cord insertion hole when the socket of the cord fastener is housed in the housing part,
the holder being made of a different and stretchy material from that of the cord fastener.

2. The holder according to claim 1, wherein the third cord insertion hole is constituted by a mounting-part-side cord insertion hole penetrating the mounting part, and a housing-part-side cord insertion hole penetrating the housing part facing the mounting part side cord insertion hole.

3. The holder according to claim 1, wherein the housing part has a finger stopper in a form of wavy concave convexes on an outer surface of the bottom wall.

* * * * *